United States Patent
Han et al.

(10) Patent No.: US 9,449,230 B2
(45) Date of Patent: Sep. 20, 2016

(54) FAST OBJECT TRACKING FRAMEWORK FOR SPORTS VIDEO RECOGNITION

(71) Applicant: Zepp Labs, Inc., Los Gatos, CA (US)

(72) Inventors: Zheng Han, Beijing (CN); Xiaowei Dai, Beijing (CN); Seong Jae Hwang, Duluth, GA (US); Jason Fass, San Jose, CA (US)

(73) Assignee: Zepp Labs, Inc., Los Gatos, CA (US)

( * ) Notice: Subject to any disclaimer, the term of this patent is extended or adjusted under 35 U.S.C. 154(b) by 0 days.

(21) Appl. No.: 14/554,652

(22) Filed: Nov. 26, 2014

(65) Prior Publication Data

US 2016/0148054 A1 May 26, 2016

(51) Int. Cl.
*G06K 9/00* (2006.01)
*G06T 7/00* (2006.01)
*G06T 7/20* (2006.01)

(52) U.S. Cl.
CPC ......... *G06K 9/00724* (2013.01); *G06T 7/0044* (2013.01); *G06T 7/2026* (2013.01); *G06T 7/2053* (2013.01); *G06T 2207/10016* (2013.01); *G06T 2207/20021* (2013.01); *G06T 2207/20144* (2013.01); *G06T 2207/30196* (2013.01); *G06T 2207/30221* (2013.01)

(58) Field of Classification Search
None
See application file for complete search history.

(56) References Cited

U.S. PATENT DOCUMENTS

| | | | |
|---|---|---|---|
| 5,610,590 A | 3/1997 | Johnson et al. | |
| 5,819,206 A | 10/1998 | Horton et al. | |
| 6,224,493 B1 | 5/2001 | Lee et al. | |
| 7,978,081 B2 | 7/2011 | Shears et al. | |
| 8,032,875 B2* | 10/2011 | Kosche | G06F 8/443 717/130 |
| 8,109,816 B1 | 2/2012 | Grober | |
| 8,134,596 B2* | 3/2012 | Lei | G06K 9/00369 348/169 |
| 8,191,055 B2* | 5/2012 | Ritzau | G06F 9/445 717/151 |
| 8,282,487 B2 | 10/2012 | Wilson et al. | |
| 8,337,335 B2 | 12/2012 | Dugan | |
| 8,409,024 B2 | 4/2013 | Marty et al. | |
| 8,409,025 B2 | 4/2013 | Stites et al. | |
| 8,449,402 B2 | 5/2013 | Jaekel et al. | |
| 8,523,696 B2 | 9/2013 | Kamino et al. | |
| 8,582,821 B1* | 11/2013 | Feldman | G06T 7/204 348/169 |
| 8,589,114 B2* | 11/2013 | Papadourakis | A63B 69/00 473/223 |
| 8,593,286 B2 | 11/2013 | Razoumov et al. | |

(Continued)

OTHER PUBLICATIONS

Allen, R., "Wireless Sensor Architecture Uses Bluetooth Standard" Electronic Design, Aug. 7, 2000, 5 Pages, Can be retrieved from <URL:http://electronicdesign.com/communications/wireless-sensor-architecture-uses-bluetooth-standard>.

(Continued)

*Primary Examiner* — Nancy Bitar
(74) *Attorney, Agent, or Firm* — Fenwick & West LLP

(57) ABSTRACT

A solution is provided for object tracking in a sports video is disclosed. A determination whether a position of the object was identified in a previous video frame is made. If the position of the object was identified in the previous video frame, a new position of the object is identified in a current video frame based on the identified position of the object in the previous video frame. An expected position of the object is identified based on the identified position of the object in the previous video frame and a trained object classification model. A determination is made whether the new position is consistent with the expected position; if the new position is consistent with the expected position, the new position is stored as the position of the object in the current frame.

25 Claims, 17 Drawing Sheets

(56) References Cited

U.S. PATENT DOCUMENTS

| | | | |
|---|---|---|---|
| 8,903,521 | B2 | 12/2014 | Goree et al. |
| 8,905,855 | B2 | 12/2014 | Fitzpatrick et al. |
| 8,941,723 | B2 | 1/2015 | Bentley et al. |
| 8,944,928 | B2 | 2/2015 | Kaps et al. |
| 8,956,238 | B2 | 2/2015 | Boyd et al. |
| 9,039,527 | B2 | 5/2015 | Bentley et al. |
| 9,224,194 | B2 * | 12/2015 | Wang ............... G06T 5/003 |
| 2004/0131254 | A1 | 7/2004 | Liang et al. |
| 2005/0032582 | A1 | 2/2005 | Mahajan et al. |
| 2005/0196017 | A1 | 9/2005 | Altherr et al. |
| 2005/0272516 | A1 | 12/2005 | Gobush |
| 2006/0025229 | A1 | 2/2006 | Mahajan et al. |
| 2006/0166738 | A1 | 7/2006 | Eyestone et al. |
| 2007/0057049 | A9 | 3/2007 | Kundu et al. |
| 2008/0085778 | A1 | 4/2008 | Dugan |
| 2009/0048044 | A1 | 2/2009 | Oleson et al. |
| 2010/0103269 | A1 | 4/2010 | Wilson et al. |
| 2010/0144414 | A1 | 6/2010 | Edis et al. |
| 2010/0323794 | A1 | 12/2010 | Su |
| 2011/0081043 | A1 | 4/2011 | Sabol et al. |
| 2014/0056477 | A1 | 2/2014 | Pakulski et al. |
| 2014/0205141 | A1 * | 7/2014 | Gao .................. G06T 7/20 382/103 |

OTHER PUBLICATIONS

Arfwedson, H., et al., "Ericsson's Bluetooth Modules," Ericsson Review, 1999, No. 4, pp. 198-205, <URL:http://www.ericsson.com/ericsson/corpinfo/Pub.s/review/1999_04/files/19990404.pdf>.

Bishop, R., "LabVIEW 8 Student Edition," 2007, 12 pages, Pearson Prentice-Hall, Upper Saddle River, NJ.

First Annual "Better Golf Through Technology," Better Golf Through Technology Conference, Feb. 17-18, 2006, 1 page, [Archived on web.archive.org on Mar. 14, 2006] Can be Retrieved at <URL:https://web.archive.org/web/20060314063211/http://www.bettergolfthroughtechnology.com/>.

Home Page for "Concept2: Training," 1 page, [Archived on web.archive.org on Feb. 5, 2009] Can be Retrieved at <URL:http://web.archive.org/web/20090205092657/http://concept2.com/us/training/default.asp>.

Home Page for Expresso.com, 2 pages, [Archived on web.archive.org on Apr. 29, 2009] Can be Retrieved at <URL:http://web.archive.org/web/20090426023759/http://expresso.com/products_services/index.html#>.

Honan, M., "Apple unveils iPhone," Macworld, Jan. 89, 2007, 4 Pages, can be retrieved at <URL:http://www.macworld.com/article/1054769/iphone.html>.

Invensense, "InvenSense™ Unveils World's 1st IMU Solution for Consumer Appl.s" InvenSense, Apr. 6, 2010, 2 pages.

Kalia, M., et al., "Efficient Policies for Increasing Capacity in Bluetooth: An Indoor Pico-Cellular Wireless System," IBM India Research Laboratory, 2000, 5 pages.

Linx Technologies, "HP3 Series Transmitter Module Data Guide" Linx Technologies, Inc., 2008, Revised Jul. 27, 2011, 13 Pages.

Otto, C., et al., "System Architecture of a Wireless Body Area Sensor Network for Ubiquitous Health Monitoring," Journal of Mobile Multimedia, 2006, pp. 307-326, vol. 1, No. 4.

Rao, R., et al., "Demand-based Bluetooth Scheduling," Pennsyvania State University, Sep. 27, 2001, 13 pages, Can be retrieved at <URL:http://www.cse.psu.edu/~gik2/papers/Bluetooth1.doc>.

Roving Networks, "Blue Sentry RN-8005-CB Data Sheet," 2009, 1 page.

Sanders, K., "Japanese WII Price, Release Date Revealed," IGN US, Sep. 13, 2006, 1 Page, can be retrieved at <URL:http://www.ign.com/articles/2006/09/14/japanese-wii-price-release-date-revealed>.

Smartswing, "SmartSwing Introduces Affordable Intelligent Golf Club," Press Release, Jul. 19, 2005, 2 pages, [Archived on web.archive.org on Jun. 13, 2006] Can be Retrieved at <URL:https://web.archive.org/web/20060613114451/http://www.smartswing-golf.com/site/news/pr_2006_jan_23_aus.html>.

State Technology, "MEMS Enable Smart Golf Clubs," Extension Media, Jan. 6, 2005, 3 pages, [Archived on web.archive.org on Jan. 15, 2016] Can be Retrieved at <URL:https://web.archive.org/web/20160115202844/http://electroiq.com/blog/2005/01/mems-enable-smartgolf-clubs/>.

Takahashi, D., "Facebook, Twitter, Last.fm coming to Xbox Live this fall" Venture Beat, Jun. 1, 2009, 5 Pages, Can be retrieved from <URL:http://venturebeat.com/2009/06/01/facebook-coming-to-xbox-live-as-microsoft-beefs-up-other-entertainment-on-xbox-360/>.

The iClub System™ "iClub.net—Contact," Fortescue Corp. 2001-2005, 1 Page, [Archived on web.archive.org on Apr. 9, 2005] Can be Retrieved at <URL:https://web.archive.org/web/20050409111624/http://www.iclub.net/contact.html>.

The iClub System™ "iClub.net—Products," Fortescue Corp. 2001-2005, 1 Page, [Archived on web.archive.org on Jul. 10, 2005] Can be Retrieved at <URL:https://web.archive.org/web/20050710075533/http://www.iclub.net/products-iclub.html.

The iClub System™ "iClub.net—Products ICLUB$^e$," Fortescue Corp. 2001-2005, 1 Page, [Archived on web.archive.org on Apr. 14, 2005] Can be Retrieved at <URL:https://web.archnie.org/web/20050414233840/http://www.iclub.net/products-iclube.html.

The iClub System™ "iClub.net—Products ICLUB (Full Swing)," Fortescue Corp. 2001-2005, 1 Page, [Archived on web.archive.org on Apr. 14, 2005] Can be Retrieved at <URL:https://web.archive.org/web/20050414233828/http://www.iclub.net/products-iclub.html.

The iClub Product Brochure, 2001-2005, 2 pages.

Tuite, D., "Motion-Sensing MEMS Gyros And Accelerometers Are Everywhere," Electronic Design, Jul. 9, 2009, 6 pages, Can be retrieved from <URL:http://electronicdesign.com/analog/motion-sensing-mems-gyros-and-accelerometers-are-everywhere>.

Webster's New College Dictionary, Definition for "Virtual Reality," (3$^{rd}$ ed. 2008), 3 Pages.

Webpage for zigbees.com, 4 Pages, [online] [retrieved on Mar. 14, 2016] Can be retrieved at <URL:http://www.zigbees.com/h_start.htm>.

Wheeler, A, et al., "Introduction to Engineering Experimentation," 2$^{nd}$ Edition, 2004, Chapter 4, 10 pages, Pearson—Prentice-Hall, Upper Saddle River, NJ.

Affidavit of Christopher Butler dated Jan. 15, 2016 regarding "Rinton Press—Publisher in Science and Technology," 6 pages, [Archived on web.archive.org on Jan. 3, 2007] Can be Retrieved at <URL:https://web.archive.org/web/20070103234656/http://rintonspress.com/journals/jmmonline.html>.

Affidavit of Christopher Butler dated Jan. 25, 2016 regarding "SmartWing Intelligent Clubs," 46 Pages, [Archived on web.archive.org on Apr. 11, 2006] Can be Retrieved at <URL:https://web.archive.org/web/20060411113841/http://www.smartswinggolf.com/site/>.

Affidavit of Christopher Butler dated Feb. 19, 2016 regarding "Concept2: Training," 5 pages, [Archived on web.archive.org on Feb. 5, 2009] Can be Retrieved at <URL:http://web.archive.org/web/20090205092657/http://concept2.com/us/training/default.asp>.

Certified File History of U.S. Pat. No. 8,905,855, Feb. 2, 2016, 709 Pages.

Certified File History of U.S. Pat. No. 8,941,723, Feb. 2, 2016, 929 Pages.

File History of U.S. Pat. No. 8,903,521, 2015, 406 pages.

Certified File History of U.S. Pat. No. 8,944,928, Feb. 2, 2016, 647 Pages.

Certified File History of U.S. Pat. No. 9,039,527, Feb. 2, 2016, 1047 Pages.

Declaration of Dr. Steven M. Nesbit, U.S. Pat. No. 8,905,855, Feb. 24, 2016, 235 Pages.

Declaration of Dr. Steven M. Nesbit, U.S. Pat. No. 8,941,723, Feb. 24, 2016, 219 Pages.

(56) References Cited

OTHER PUBLICATIONS

Declaration of Dr. Steven M. Nesbit, U.S. Pat. No. 8,903,521, Feb. 24, 2016, 250 Pages.
Declaration of Dr. Steven M. Nesbit, U.S. Pat. No. 8,944,928, Feb. 24, 2016, 195 Pages.
Declaration of Dr. Steven M. Nesbit, U.S. Pat. No. 9,039,527, Feb. 24, 2016, 227 Pages.
Curriculum Vitae of Dr. Steven M. Nesbit, Feb. 24, 2016, 10 Pages.
Claim Limitation Reference Nos. '855 Petition, Feb. 24, 2016, 6 pages.
Claim Limitation Reference Nos. '723 Petition, Feb. 24, 2016, 5 pages.
Claim Limitation Reference Nos. '521 Petition, Feb. 24, 2016, 4 pages.
Claim Limitation Reference Nos. '928 Petition, Feb. 24, 2016, 3 pages.
Claim Limitation Reference Nos. '527 Petition, Feb. 24, 2016, 4 pages.
PCT International Search Report and Written Opinion for PCT/US2015/060419, Mar. 31, 2016, 9 Pages.

* cited by examiner

FAST OBJECT TRACKING FRAMEWORK FOR SPORTS VIDEO RECOGNITION

BACKGROUND

This invention relates generally to digital content processing and particularly to object tracking in sports video content from videos captured by mobile computing devices.

Motion detection and tracking of a moving object, such as a golf swing, are widely used to enhance athletes' performance. Taking golf as an example, golf is a sport that often requires good control of motions of a golf club, and an accurate analysis of the golf swing motions detected by a motion sensor can enhance golf players' performances. One way to enhance a player's sports performance is to analyze the motion data by tracking the player's fast moving golf club.

Some conventional systems that capture the motion of the player use additional equipment that can capture the velocity and or acceleration of objects such as a golf club or a baseball bat. Alternatively, the analysis of the motion is performed based on a video of the player performing the motion. The sports video may be captured using a handheld device. However, conventional solutions of object tracking for handheld devices also face the challenge of practically and accurately tracking the objects of interest, which often move extremely fast and deform drastically in sports videos. Handheld devices oftentimes have a limited computing power and memory and thus, the analysis of the video may take an unacceptable long amount of time. Additionally, due to the size of the video, a user of the handheld device may not want to transmit the video to a different computing device with larger computing resources.

SUMMARY

Embodiments of the invention provide a solution to track the motion of a player in a sports video content. The motion tracking service tracks the motion of a player performing a sports motion and displays analyzed data to enable the player to determine the characteristics of the motion.

A computer-implemented method for tracking objects in a sports video is disclosed. Embodiments of the method comprise determining whether a position of the object was identified in a previous video frame. If the position of the object was identified in the previous video frame, a new position of the object is identified in a current video frame based on the identified position of the object in the previous video frame. An expected position of the object in the current video frame is identified based on the identified position of the object in the previous video frame and a trained object classification model. A determination is made whether the new position is consistent with the expected position, and if the new position is consistent with the expected position, the new position is stored as the position of the object in the current frame.

Another aspect provides a non-transitory computer-readable storage medium storing executable computer program instructions for tracking objects in a sports video as described above. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

A solution is provided to track the motion of a sports player in a video. The motion tracking service tracks the movement of objects in a sports video and analyses the tracked objects. Objects in the sports video are detected by subtracting background information from the sports video and tracked using an object classification model trained offline, e.g., offline machine learning. The tracking results of the sports video are analyzed. The analysis of the tracking results is provided to the player in a user friendly way.

Figure 1:
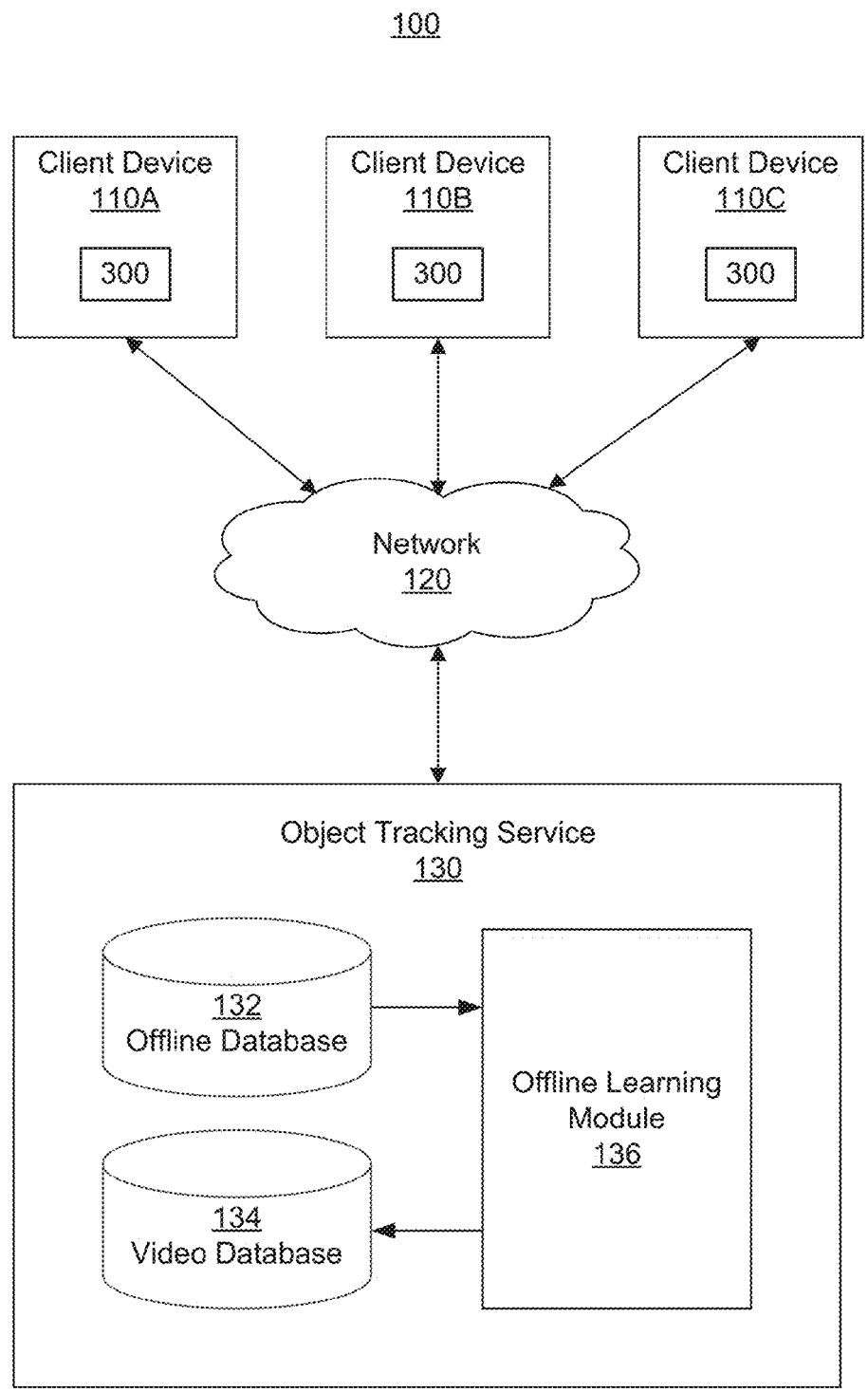
FIG. 1 is a block diagram of a computing environment for tracking objects in sports video content according to one embodiment.

FIG. 1 is a block diagram of a computing environment 100 for tracking the motion of objects in sports video content according to one embodiment. The embodiment illustrated in FIG. 1 includes multiple client devices 110 (e.g., 110A, 110B and 110C) and motion tracking service 130 connected to each other by a network 120. Embodiments of the computing environment 100 can have many client devices 110 and motion data devices 130 connected to the network 120. Likewise, the functions performed by the various entities of FIG. 1 may differ in different embodiments.

A client device 110 is an electronic device used by a user to perform functions such as consuming digital content, executing software applications, browsing websites hosted by web servers on the network 120, downloading files, and the like. For example, the client device 110 may be a media streaming device, a smart phone, or a tablet, notebook, or desktop computer. The client device 110 includes and/or interfaces with a display device on which the user may view videos and other content. In addition, the client device 110 provides a user interface (UI), such as physical and/or on-screen buttons, with which the user may interact with the client device 110 to perform functions such as viewing, selecting, and consuming digital content such as sports instructional videos. In one embodiment, the client device 110 has an object tracking engine 300 for tracking objects in sports videos captured by the client device 110. The object tracking engine 300 is further described below with reference to FIG. 3.

The object tracking service 130 includes an offline database 132 for storing a large video corpus of different sports video content and complexity, a video database 134 for storing videos captured by the client devices 110 and an offline learning module 136 for training an object classification model to classify sports videos of desired traits. The offline learning module 136 provides the trained model to the client device 110 to classify a video captured by the client device 110 in real time. The offline learning module 136 is further described below with reference to FIG. 3.

In this disclosure, "video content," "digital content" or "digital media content" generally refers to any machine-readable and machine-storable work. Digital content can include, for example, video, audio or a combination of video and audio. Alternatively, digital content may be a still image, such as a JPEG or GIF file or a text file. For purposes of simplicity and the description of one embodiment, the digital content will be referred to as a "video," "video files," or "video items," but no limitation on the type of digital content that can be analyzed are intended by this terminology.

The network 120 enables communications among the client device 110 and the object tracking service 130. In one embodiment, the network 120 comprises the Internet and uses standard communications technologies and/or protocols. In another embodiment, the entities can use custom and/or dedicated data communications technologies.

Computing System Architecture

Figure 2:
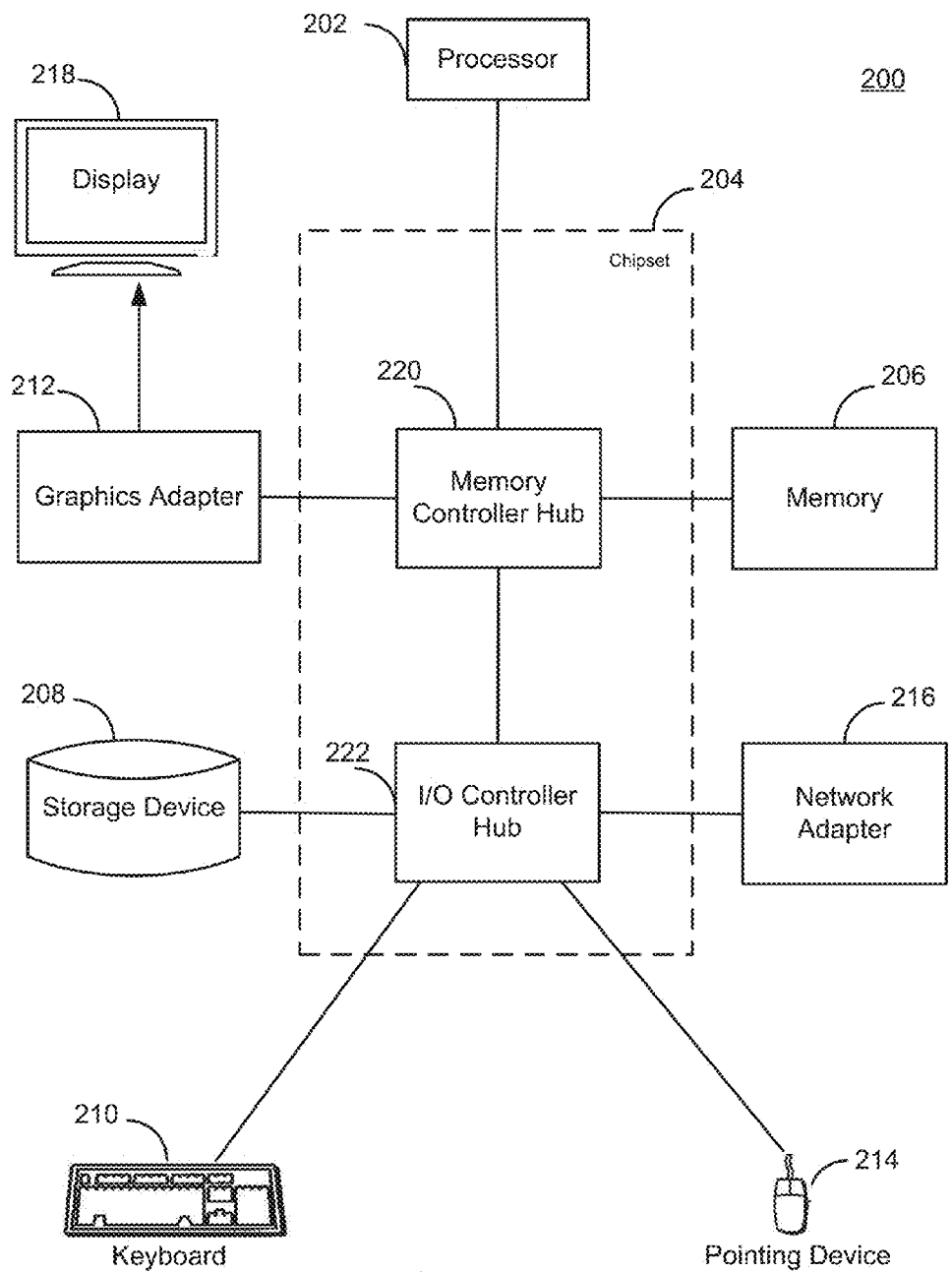
FIG. 2 is a block diagram illustrating an example of a computer for acting as a client device according to one embodiment.

The entities shown in FIG. 1 are implemented using one or more computers. FIG. 2 is a high-level block diagram of a computer 200 for acting as the object tracking service 130 and/or a client device 110 according to one embodiment. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any non-transitory computer-readable storage medium, such as a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 120.

As is known in the art, a computer 200 can have different and/or other components than those shown in FIG. 2. In addition, the computer 200 can lack certain illustrated components. For example, the computers acting as the object tracking service 130 can be formed of multiple blade servers linked together into one or more distributed systems and lack components such as keyboards and displays. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Figure 3:
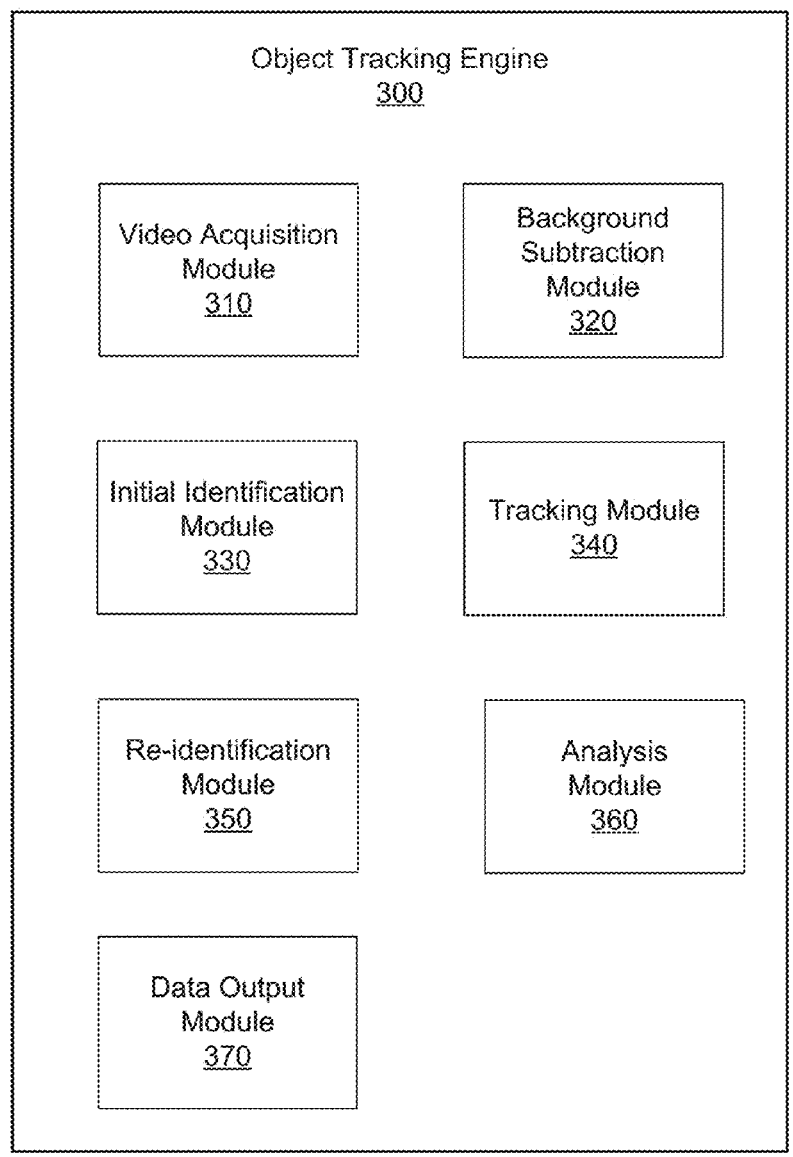
FIG. 3 is a block diagram of a motion tracking engine according to one embodiment.

FIG. 3 is a block diagram of an object tracking engine 300 of a client device 110 according to one embodiment. The object tracking engine 300 analyzes sports video content captured by the client device 110, tracks objects in the sports videos and outputs the tracked path of the objects to users of the client device 110. In one embodiment, the object tracking engine 300 has a video acquisition module 310, a background subtraction module 320, an initial identification module 330, a tracking module 340, a re-identification module 350, an analysis module 360 and a data output module 370. Other embodiments of the motion tracking engine 300 can have different and/or additional computer modules. Likewise, the functions performed by the various entities of FIG. 3 may differ in different embodiments.

Sports Video Acquisition

The video acquisition module 310, e.g., the embedded digital camera of a smart phone, captures a video of a player performing a sports motion. For instance, the video acquisition module 310 captures a video of a player swinging a golf club, or swinging a baseball bat. The captured videos can be of any type or property because the video acquisition module 310 does not require any other types of inputs or feedbacks from external sources, e.g., motion sensors. It is noted that the environment of a video being taken is expected to be static by minimizing the camera movement while the video is being taken, and that certain camera poses are assumed, which are specific for each application. For example, for detecting a golf swing of a golfer, the video is expected to be taken from the side of the golfer so the video shows the side of the golfer's face when the golfer is facing forward. All videos for baseball and golf should be taken form side view or face on.

Figure 6A:
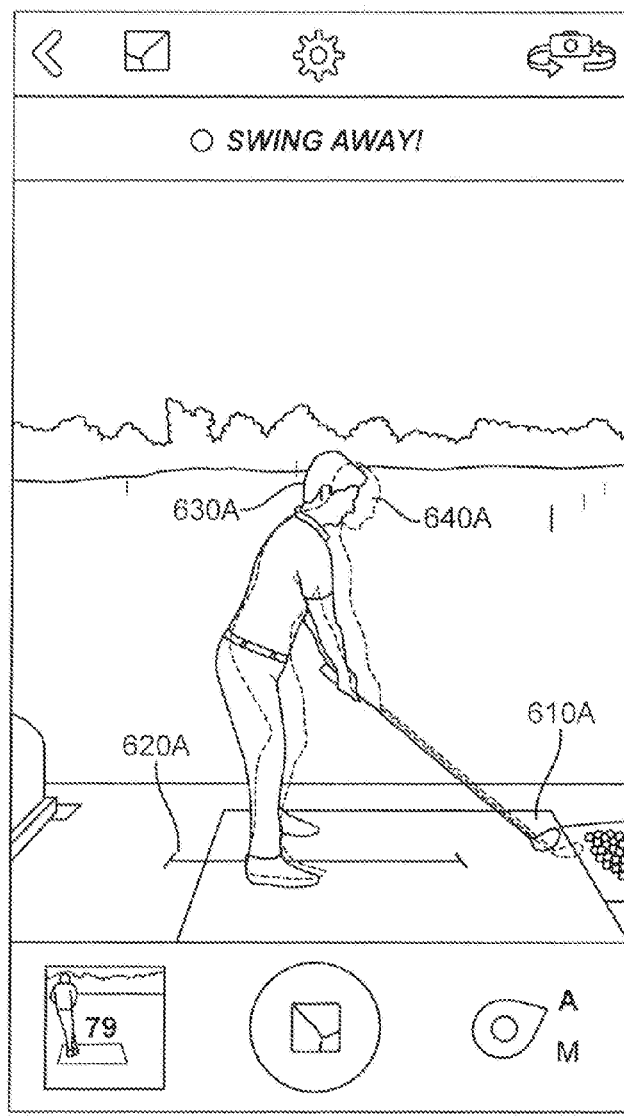
FIG. 6A is an exemplary user interface of a visual overlay for capturing a golf sports video according to one embodiment.
Figure 6B:
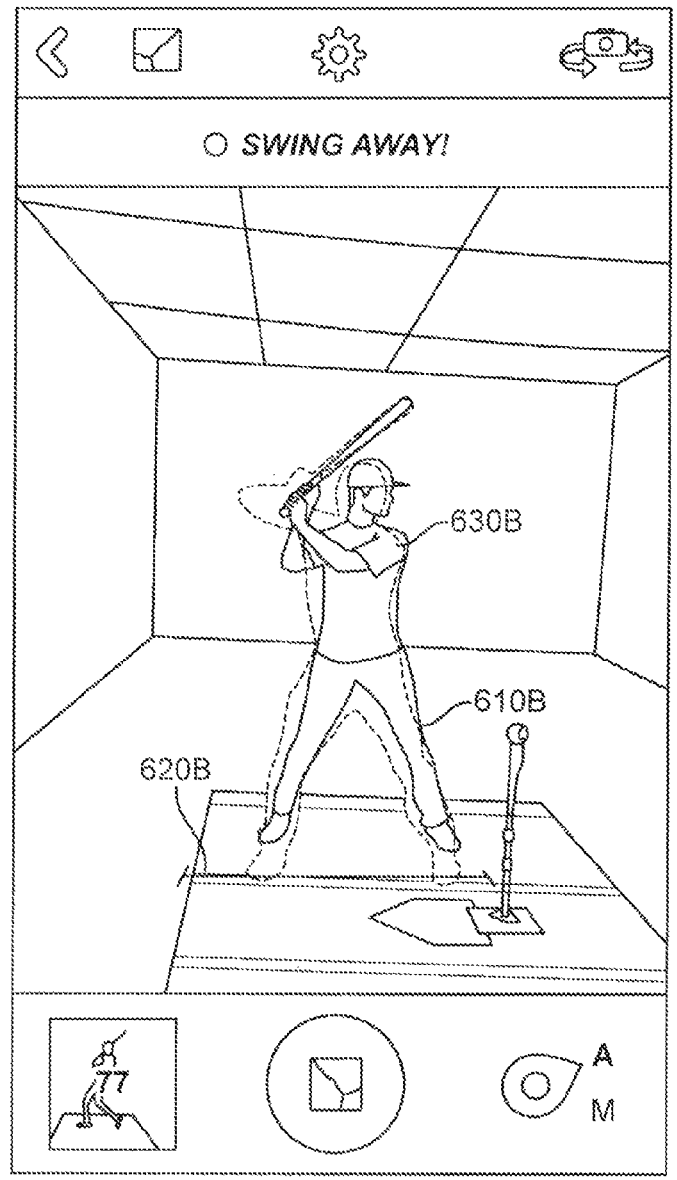
FIG. 6B is an exemplary user interface of a visual overlay for capturing a baseball sports video according to one embodiment.

In some embodiments, the video acquisition module 310 displays a visual overlay on a display of a video capturing application running on a user's mobile device (e.g., a smart phone), as illustrated in FIG. 6A and FIG. 6B. The visual overlay guides the user of the client device 110 to take videos of a player in certain camera poses. For a golf video application as illustrated in FIG. 6A, the ideal initial feet of a player (620A) and club head positions (610A) are suggested with overlay drawings (e.g., the shape represented by the dotted line) so the user (630A) of the client device can fit the golfer's feet and club head into the corresponding positions shown in the overlay. FIG. 6A shows a gap between the user's actual head position (630A) and the position (640A) suggested by the overlay. FIG. 6B illustrates a visual overlay for guiding a video capturing application to capture a baseball sports video of a user. In the illustration of FIG. 6B, the user's actual body position is well aligned with the position suggested by the overlay. In one embodiment, the visual overlay is static, which can help the user to take more stable videos for more accurate object tracking. However, the video acquisition module 310 does not expect any visual cues such as specific objects or backgrounds from the video, allowing the video to be taken in any reasonable environment.

Using visual overlay to guide a user when taking a video of a player improves object tracking efficiency and accuracy. The visual overlay reduces the area where certain objects may be initially located. For instance, when recording a golf club swing motion, the initial position of the golf club head and the player's hand in a video frame may be searched in a reduced area instead of the entire video frame. The reduced search area using visual overlay also improves accuracy of the detection of objects in a video frame by eliminating highly unlikely locations which the probability of false positive is still nonzero. Additionally, the sizes of the objects to be tracked can be controlled because the training data for object tracking can intentionally be of similar sizes to reduce the variance of detection.

The captured videos can be of various characteristics, e.g., frame rate, resolutions, length and encoding formats. In one embodiment, the captured videos have a high frame rate and/or a high resolution for more accurate and finer tracking results. For example, the videos are taken using iPhone5s and the captured videos are of 720 pixels by 1280 pixels resolution with a frame rate of 120 frames per second and generally last 5 seconds for golf and 3 seconds for baseball.

Background Subtraction in a Sports Video

A sports video captured by a client device 110 often contains a background in the video frames of the sports video. The background in a video frame can contribute noise for tracking one or more objects of interest in the video frame. Generally, without any prior knowledge about the potential location of the objects of interests to be tracked in a video frame, the entire frame is considered by sliding a patch window from corner to corner. However, considering the entire video frame is computationally exhaustive, which is proportional to the video resolution, and inefficient when the expected instances of objects to be detected in the video frame are small. The background subtraction module 320 subtracts the background from a video frame to increase the efficiency of the detection of the object. In one embodiment, the background subtraction module 320 extracts the dynamically moving objects in the video (also referred to as the foreground) from the static part of the video (also referred to as the background). Because the objects of interests in tracking problems are highly dynamic, background subtraction prior to the object detection stage reduces the search space of the objects to be tracked and increases the detection speed and accuracy in the subsequent steps.

The dynamism of a region of a video frame can be understood as a measure of change of the region over time. In one embodiment, each video frame of a captured video is partitioned into a grid of patches of same size and patches are labeled patch-wise instead of pixel-wise. The dynamism of each patch between two consecutive video frames is computed as a sum of squared differences of red green blue (RGB) values of each pixels of the patch. At each frame, a score of dynamism of a patch is the dynamism value of the patch of the current video frame and the previous video frame plus the dynamism value of the current video frame and the next video frame. Once every patch of all the video frames has a dynamism score, the scores are smoothed in time and space to eliminate noisy patches. If the dynamism score of the patch is higher than a predefined threshold, the patch is determined to be a foreground patch; if the dynamism score of the patch is below the threshold, the patch is determined to be a background patch. The background subtraction module 320 generates an output for each video frame, which includes locations of the patches and a mask for the frame to indicate each of its patches as either a foreground of a background.

Figure 7A:
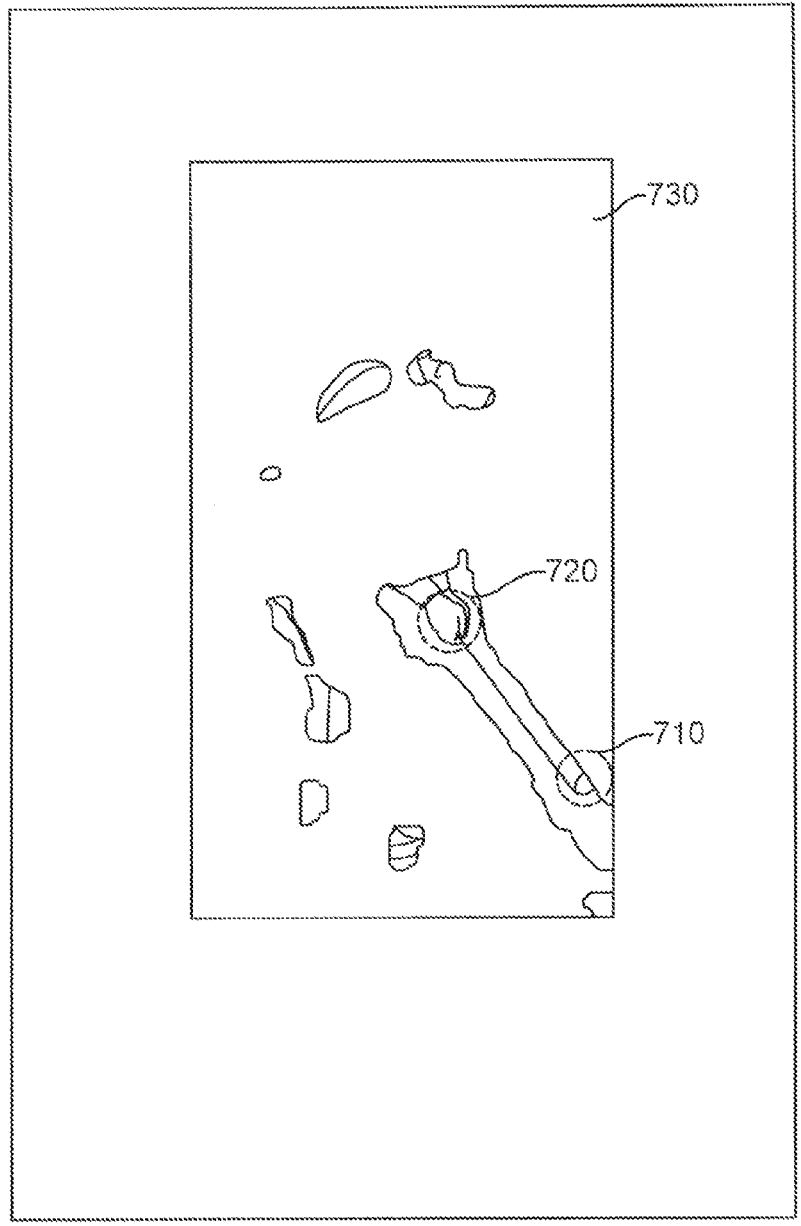
FIG. 7A is an exemplary video frame after background subtraction according to one embodiment.
Figure 7B:
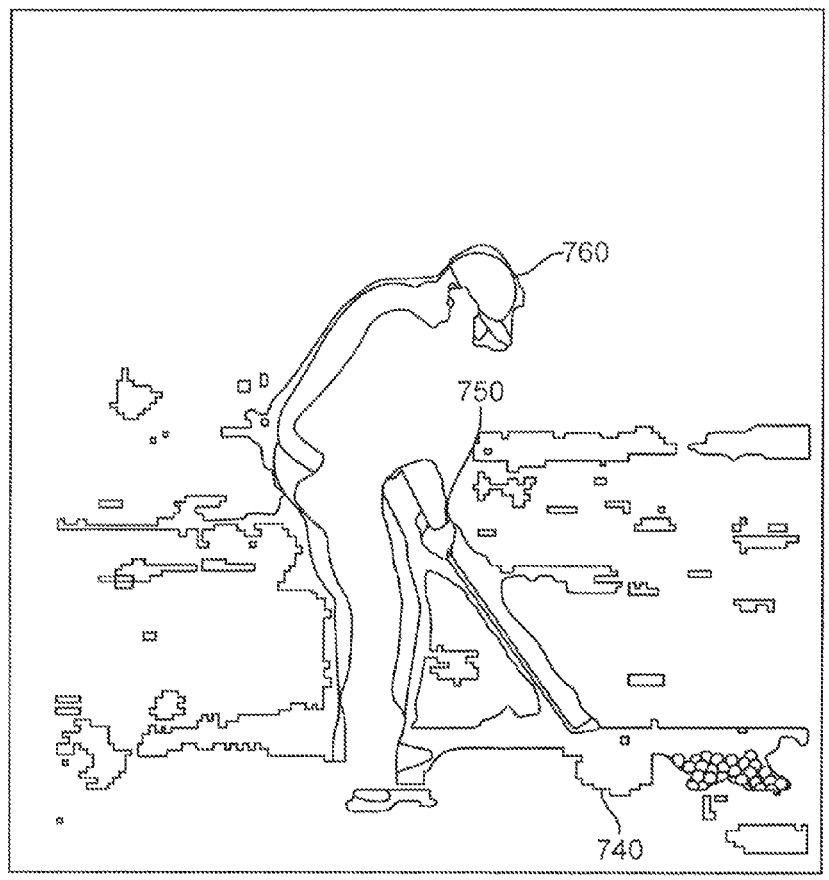
FIG. 7B shows another example of a golf video frame after background subtraction according to one embodiment.

In some embodiments, the background subtraction module uses 45 MB of memory or less regardless of the video length, and the size of video frames used for background subtraction. Generally, there is no need to do background subtraction for whole video frame, and it is preferred to choose a box region where the player stands and size is bigger than the player to do background subtraction, such as the blue box in FIG. 7A. This way can reduce the memory usage and time consumption. The process may take from 1 second to 10 seconds depending on the parameters, such as the predefined threshold, patch size, Gaussian filter size and standard deviation and temporal uniform filter size. FIG. 7A illustrates a video frame after background subtraction. The video frame of FIG. 7A shows a person playing golf, where the objects of interest include the golf club head 710, the player's hand 720 in a white background 730. FIG. 7B shows another example of a golf video frame after background subtraction, where the objects of interest, e.g., golf head (74), golfer's hand (750) and golfer's head (760), are identifiable after background subtraction.

Object Tracking in Sports Video

Once a video is acquired by the video acquisition module 310 and processed by the background subtraction module 320, the object tracking engine 300 performs object tracking on the video. In one embodiment, the object tracking processing has three phases: initial identification by the initial identification module 330, frame-level tracking by the tracking module 340 and re-identification by the re-identification module 350.

The initial identification module 330 identifies the position of an object of interest (e.g., a golf club head) in a frame of a sports video based on an offline trained object classification model. The initial identification module 330 uses a search window that slides across the region of the frame, where the object is likely to be detected. This region is determined by the visual overlay generally. Responsive to a patch in this current frame being tested as an object of interest, the initial identification module 330 records the location of the patch and identification of the frame that contains the object of interest. On the other hand, if the current frame is tested as not containing the object of interest, the initial identification module 330 selects next video frame in a temporal order and searches for the object of interest using the search window. The initial identification module 330 may repeat the same or similar process in subsequent video frames until the position of the object is identified. If there is no frame containing the object of interest, the process would consider there is no object of interest to track in the video.

At individual frame level, the object tracking engine 300 selects small patches within the frame and checks if the patches of the frame contain objects of interest. The tracking module 340 searches for an object in a video frame based on one or more visual features of the video frame. In one embodiment, the tracking module 340 uses an optical flow tracking to determine the possible current position of the object of interest following the previous position of the object of interest in previous frame. It is noted that the appearance of an object of interest constantly changes in a sports video and that tracking path of an object at frame level can be irregular, the tracking module 340 may use a median filter and a path prediction technique to increase the accuracy of the determined possible position of the object of interest.

The median filter is a median moving vector between two temporal consecutive video frames, e.g., a current frame and its previous frame, where the object of interest is possibly located in the current frame. In one embodiment, a moving vector for each of the features from the current frame and a moving vector for the corresponding feature from the previous video frame are determined. The determined moving vectors for both frames are sorted and outliers are discarded. In one embodiment, vectors smaller than a quarter (smaller than the first quartile) and vectors larger than three quarters (larger than the third quartile) are discarded as the outliers. The median of the remaining vectors is considered as the possible moving vector between the two frames.

The path prediction technique determines a predicted position of the object in the current video frame based on the position of the object in previous couples of frames, like 4 frames; in other words, the path of an object is generally assumed to be smooth. Thus, the object in the current frame is expected to be at a location on a predicted path, which is approximated with the identified object in the previous frames. The prediction technique may use a different prediction based on the object of interest that is being analyzed. For instance, a different prediction is used when the golf club is analyzed or the golfer's hand is analyzed. Here a linear prediction technique is for hand prediction and a third order curve prediction technique is used for golf club prediction. The median filter and path prediction technique is combined with optical flow to get the most possible position of the object of interest in current frame.

Responsive to most possible position of the object of interest by the tracking module 340, the re-identification module 350 re-identifies this most possible object in a video frame as the actual object based on the features of the possible object and a trained object classification model provided by the offline learning module 136 illustrated in FIG. 1. In one embodiment, the re-identification module 350 uses a feature descriptor such as Histogram of Gradients (HoG), which are the gradients of visual features, to express meaningful and distinguishing features of the patches of a frame being analyzed. Since the shapes of the objects are more consistent among different videos than the colors of the objects, HoG performs well in sports video content applications. In one embodiment, the re-identification module 350 choose 63 by 63 pixel sized patch, and divided by 9 by 9 pixel cells of 9 possible gradient orientations to computed to extract HoG vectors of 1296 elements.

The re-identification module 350 computes a score for the most possible object patch based on its HoG features and the offline trained object classification model. For simplicity of description, the score is referred to as re-identification score. The re-identification module 350 then determines whether the score is larger than a threshold or not. If the score is larger than the threshold, the re-identification module 350 considers that the most possible object is the object of interest in current frame. Otherwise, the most possible object obtained by optical flow, median filter and prediction is not considered as object of interest.

Responsive to the most possible object not being considered as the object of interest, the re-identification module 350 uses a window, which has larger size than the size of the object of interest and search the object of interest in this window. In one embodiment, the search window is set to be multiple times larger than the size of the object, e.g., two times larger. In addition, the center of the search window keeps the same as the most possible object. The re-identification module 350 would compute a score for each sliding patch in the searching window to obtain the highest core. The next step is to check whether the highest score is larger than a threshold. If the highest score is larger than the threshold, the corresponding patch is recognized as the object of interest. Otherwise, the object of interest is considered as missed in the current frame. For instance, the object of interest may be occluded by the player's body. Since the re-identification may be performed on every sliding patch in the searching window, in one embodiment, the re-identification module 350 uses a binary mask from the background subtraction to refine the searching window.

To process the next frame in response to no object of interest in the current frame is considered, the re-identification module 350 may set the searching window larger than the one previously set in the current frame, e.g., four times larger than the size of the believable object, and repeats the re-identification process in the next frame.

The re-identification module 350 uses a trained object classification model, e.g., the model trained by the offline learning module 136 illustrated in FIG. 1, to determine whether a patch is the object of interest in the video frame. The offline learning module 136 trains an object classification model by the training videos, which are stored in the offline database 132. The offline learning module 136 provides the trained model to the object tracking engine 300 for object tracking in real time.

In one embodiment, the offline learning module 136 may use a support vector machine (SVM) with radial basis function (RBF) kernel. In other embodiments, other methods, such as gentle adaboost (GentleBoost) may be used instead. SVM is a supervised learning method which finds a boundary between two classes of data which can be used to classify unlabeled data. The boundary may be found by minimizing the function as defined below in Equation (1).

$$E(w, b) = \frac{1}{2}\|w\|^2 - \sum_{i=1}^{l} \alpha_i(y_i(x_i^T w + b) - 1 + \xi_i) + C\sum_{i=1}^{l} \xi_i \quad (1)$$

Parameters w and b describe a linear boundary, $x_i$ is a training sample in a vector form and $y_i$ is its respective label. The first term maximizes the margin, which is the distance between the boundary and the data being trained, the second term minimizes the classification error, which is the difference between the actual label and the predicted label using the boundary, and the third term is a regularization term, which measures how far off the error is in terms of the distance from the boundary.

A RBF kernel may be used to create a nonlinear boundary. For instance, the RBF kernel is given by Equation (2) below:

$$k(x_i, x_j) = e^{(-\gamma |x_i - x_j|^2)} \quad (2)$$

Thus, using the RBF kernel, Equation (1) is rewritten as:

$$L(\alpha) = \sum_{i=1}^{l} \alpha_i - \frac{1}{2} \sum_{i,j} \alpha_i \alpha_j y_i y_j k(x_i, x_j) \quad (3)$$

subject to: $0 \le \alpha_i \le C, i = 1, \ldots, n$ $$\sum_{i=1}^{n} \alpha_i y_i = 0$$

In other words, the SVM solution described in Equation (1) is maximized using the RBF kernel with two parameters: C in (1) and γ in (2). In one embodiment, values 1.0 and 0.2 are used for the parameters C and γ, respectively.

If GentleBoost method is used instead, the performance of GentleBoost depends on the number of weak learners and the depth of the regression trees, which can be chosen with separate parameters. A weak learner can be any classifier that performs better than randomly classifying data. For example, regression tree can be used as the weak learner, which classifies the given data based on a single element of training sample $x_j$. In one embodiment, 300 weak learners and regression trees of maximum depths 4 is used.

Video Analysis for Smoothed Object Trajectory

The tracked object locations in a sports video can be noisy due to various factors, e.g., the subtle shaky movement from the camera that captures the sports video. The analysis module 360 smoothes the detected trajectory of the object of interest over time. For example, the initial trajectory of the tracked object consists of discrete points and the smoothed trajectory can create a continuous trajectory of the object for finer analysis In one embodiment, the analysis module 360 represents the characteristic of the trajectory of the object as an energy function that measures the distance and velocity between the respective observed and predicted points and the acceleration of the predicted points. The energy function is minimized to obtain the smoothed trajectory. By minimizing the energy function with chosen coefficients of the distance, velocity, the analysis module 360 can obtain an optimal curve of the trajectory of the object. In some embodiments, the energy function is expressed as a quadratic function with symmetric pentadiagonal matrix for the coefficients of the second order terms and a vector for the coefficients of the first order terms of the expanded energy function. In on embodiment, the Hessian of the energy function is symmetric positive definite with selected constants. Thus, the minimization of the energy function can be determined by calculating the least squares of the energy function, which reduces the computing time and memory storage requirement for smoothing process.

Figure 8A:
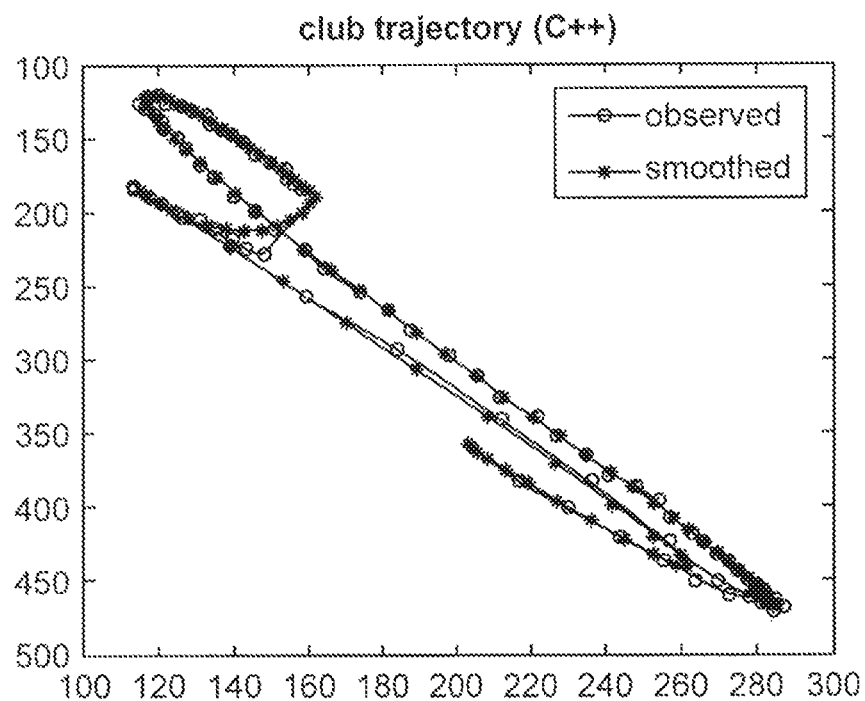
FIG. 8A is an exemplary graph of the tracked position of a golf club according to one embodiment.
Figure 8B:
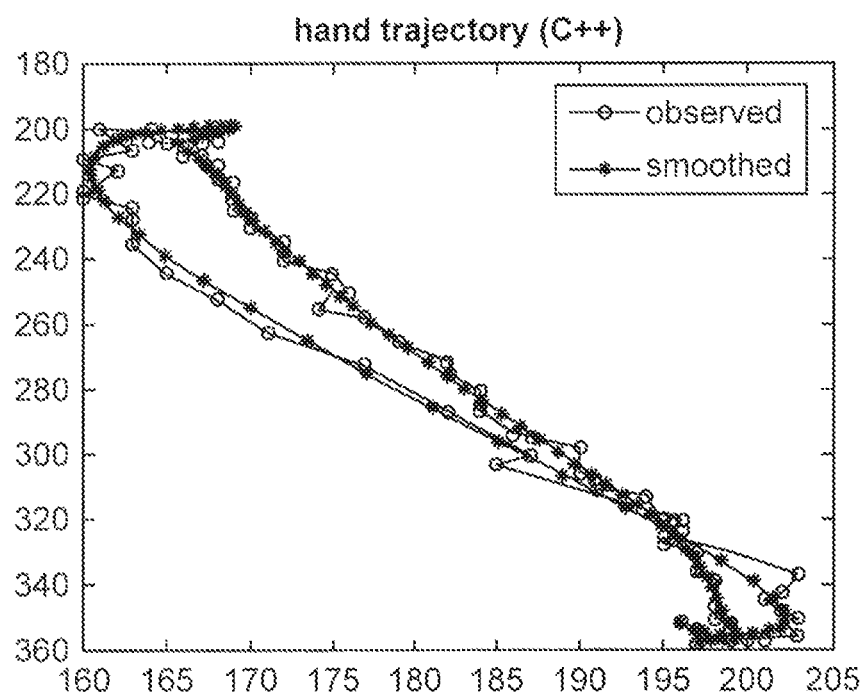
FIG. 8B is an exemplary graph of the tracked position of a golfer's hand according to one embodiment.

FIG. 8A illustrates an exemplary tracked trajectory of a golf club in a golf swing movement captured in a video frame, and FIG. 8B illustrates an exemplary tracked trajectory of a player's hand in the golf swing movement. The horizontal axis of FIGS. 8A and 8B represent the width of the trajectory of the object in terms of number of pixels, and the vertical axis of FIGS. 8A and 8B represent the length of the trajectory of the object in terms of number of pixels. As illustrated in FIGS. 8A and 8B, the tracked trajectory may include glitches and/or missing points. After smoothing the tracked trajectory, the glitches are removed and missing points are added to the smoothed trajectory.

Figure 9A:
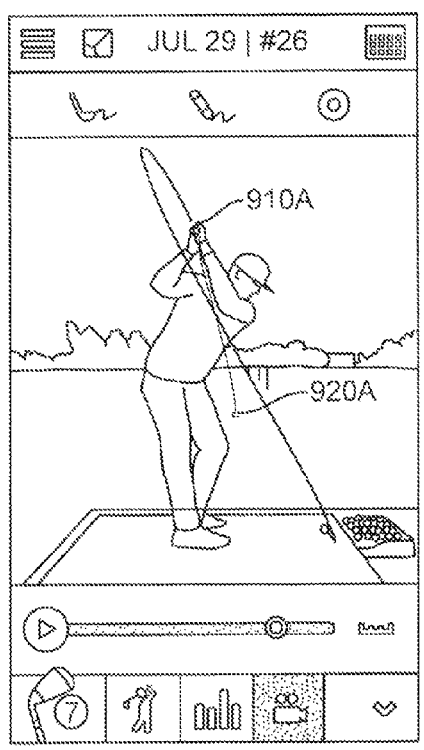
FIG. 9A, FIG. 9B and FIG. 9C are exemplary user interfaces for presenting the trajectory of the tracked objects in a golf sports video according to one embodiment.
Figure 9B:
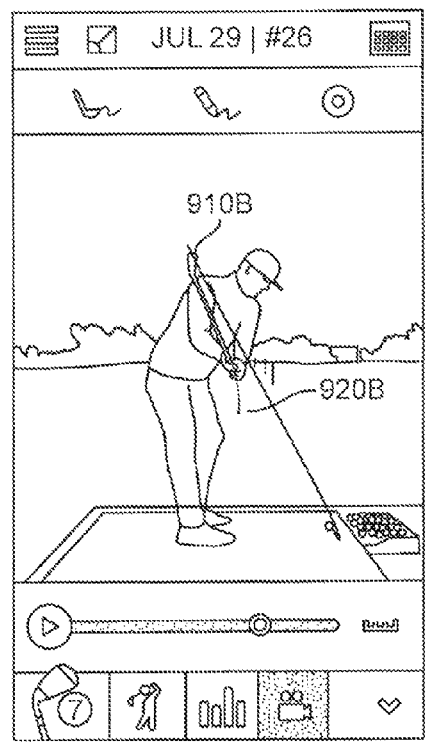
Figures 9C, 9D:
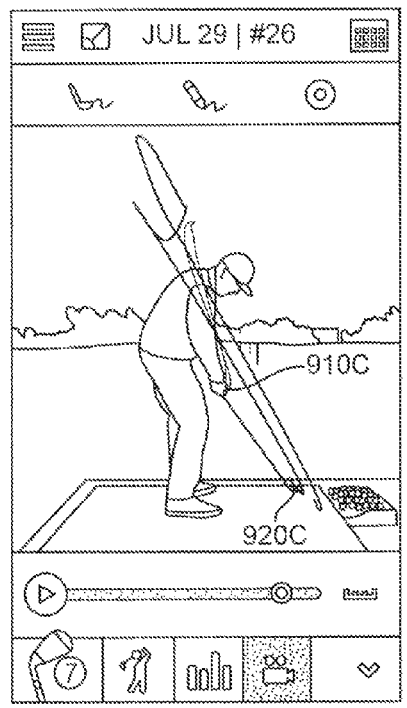
FIG. 9D is an exemplary user interface for presenting statistics of the golf sports video illustrated in FIGS. 9A-9C according to one embodiment.
Figure 10A:
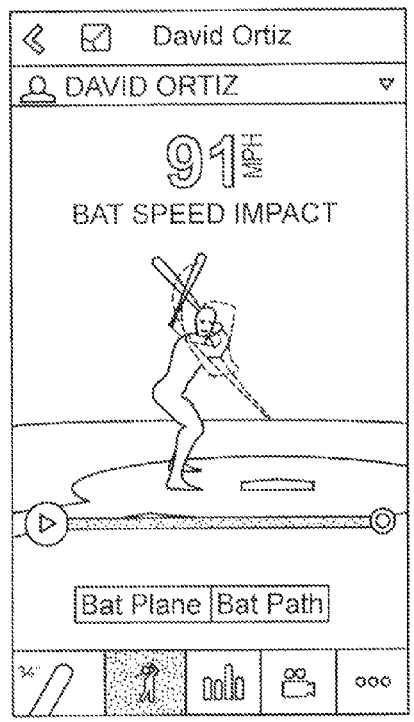
FIG. 10A, FIG. 10B and FIG. 10C are exemplary user interfaces for presenting the trajectory of the tracked objects in a baseball sports video according to one embodiment.
Figure 10B:
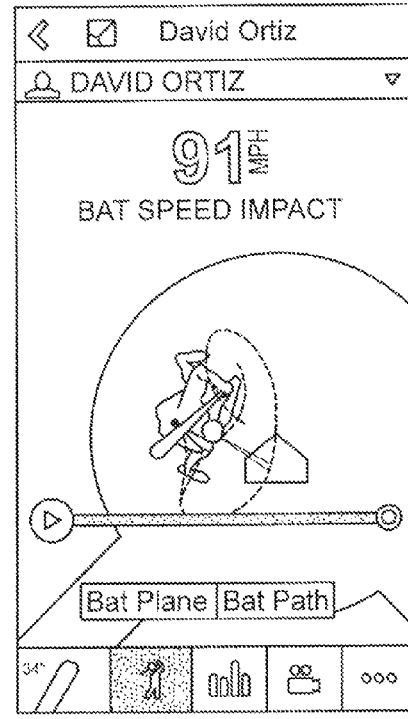
Figure 10C:
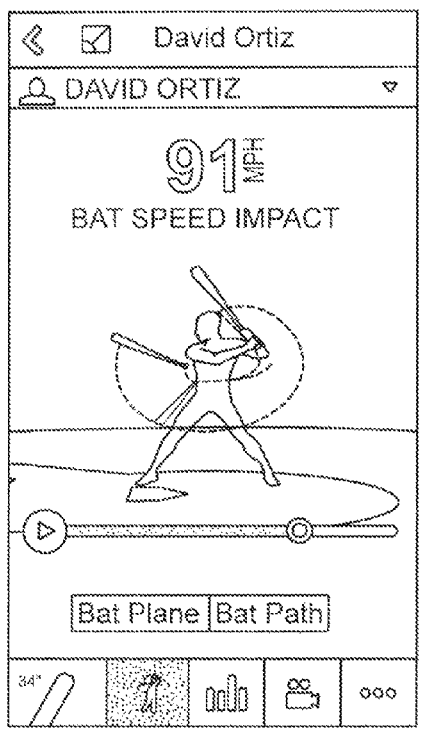
Figure 10D:
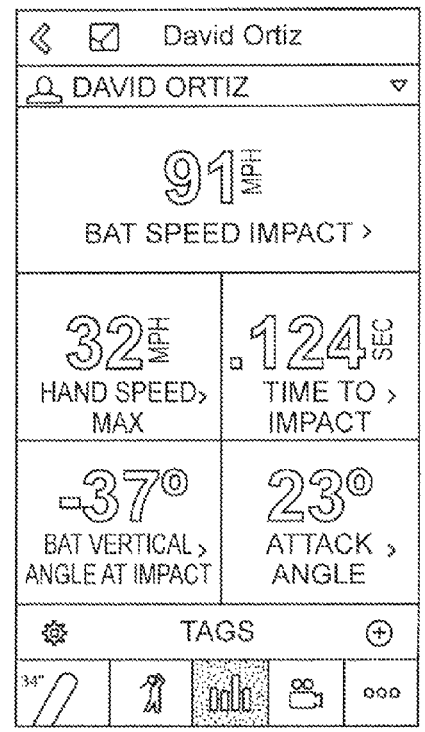
FIG. 10D is an exemplary user interface for presenting analysis statistics of the baseball sports video illustrated in FIGS. 10A-10C.
Figure 11A:
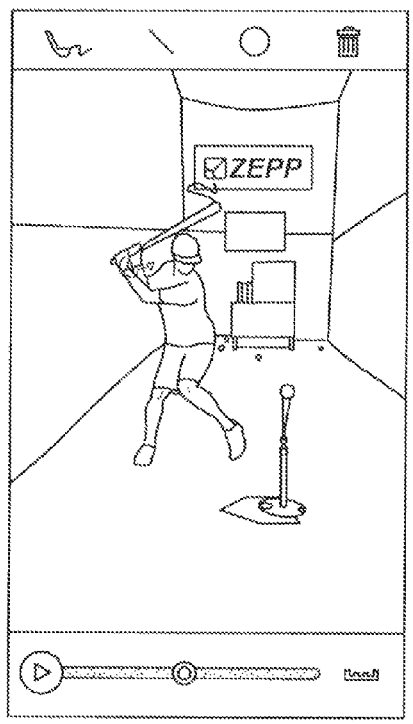
FIG. 11A, FIG. 11B and FIG. 11C are exemplary user interfaces for presenting the trajectory of the tracked objects in another baseball sports video according to one embodiment.
Figure 11B:
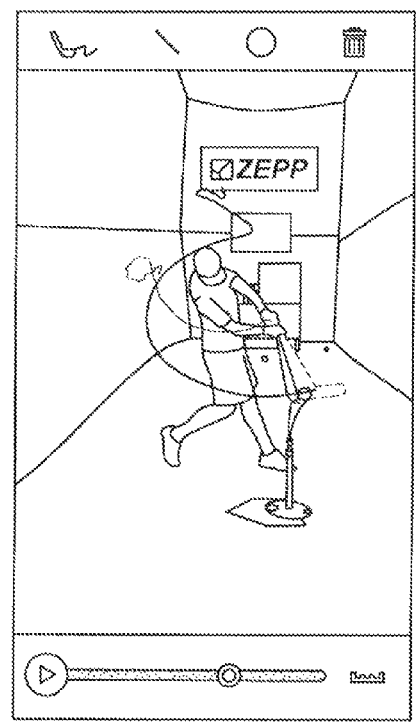
Figure 11C:
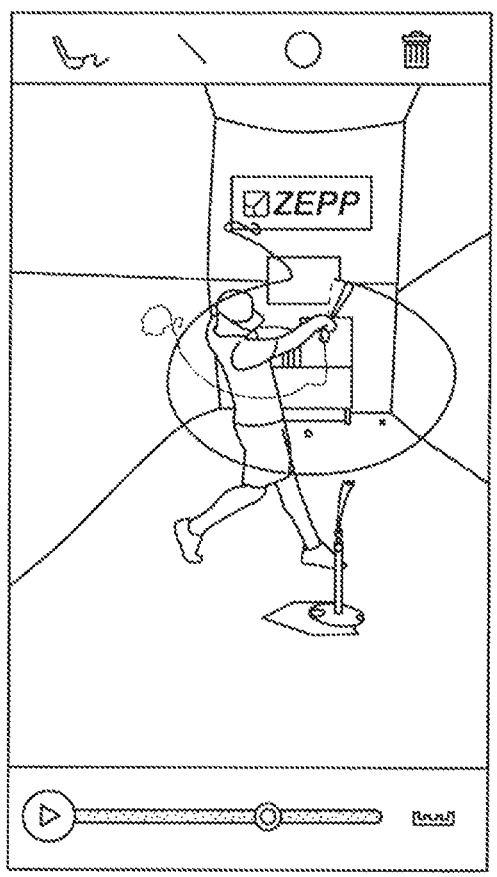

The data output module 370 outputs the analysis to a user of the client device in a user friendly way. FIG. 9A, FIG. 9B and FIG. 9C are exemplary user interfaces for presenting the trajectory of the tracked objects in a golf sports video according to one embodiment. For example, FIG. 9A illustrates a user interface UI for displaying the golfer's hand 920A and the golf club head 910A that are being tracked. FIG. 9B and FIG. 9C shows the tracked golfer's hand and the golf club head in different positions over the time. FIG. 9D is an exemplary user interface for presenting analysis statistics of the golf sports video illustrated in FIGS. 9A-9C. FIGS. 10A, 10B and 10C are exemplary user interfaces for presenting the trajectory of the tracked baseball bat over time in a baseball sports video according to one embodiment. FIG. 10D is an exemplary user interface for presenting analysis statistics of the baseball sports video illustrated in FIGS. 10A-10C. FIG. 11A, FIG. 11B and FIG. 11C are exemplary user interfaces for presenting the trajectory of the tracked objects in another baseball sports video according to one embodiment.

Exemplary Flow Charts of Object Tracking

Figure 4:
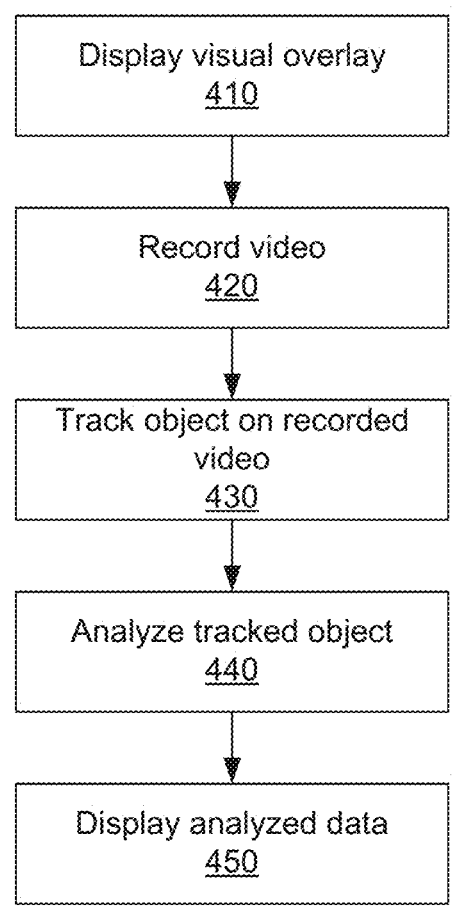
FIG. 4 is an exemplary flowchart illustrating a process for object tracking in a sports video according to one embodiment.

FIG. 4 illustrates steps for object tracking in a sports video according to one embodiment. A visual overlay is displayed 410 on a screen of a client device, e.g., a smart phone, when a user captures a sports video using his/her smart phone. The visual overlay aids the user to align the player during the video capture by providing a stable camera position and preferred camera pose. In some embodiments, a different visual overlay is displayed for different types of sports motion. For instance, one visual overlay is used for a golf club swing, and a different visual overlay is displayed for a baseball bat swing.

A video of the player performing the sports motion is recorded 420 using the video acquisition module 310. In some embodiments, the video is recorded with a high resolution and high frame rate. For instance, the video is recorded with a resolution of 1280×720 pixels at 120 frames per second. The length of the video may be dependent on the type of sports motion being recorded. In some embodiments, the video is recorded for 4 seconds or less. In some embodiments, before recording the video, a countdown is displayed to queue the player to perform the sports motion after the recording starts.

Figure 5A:
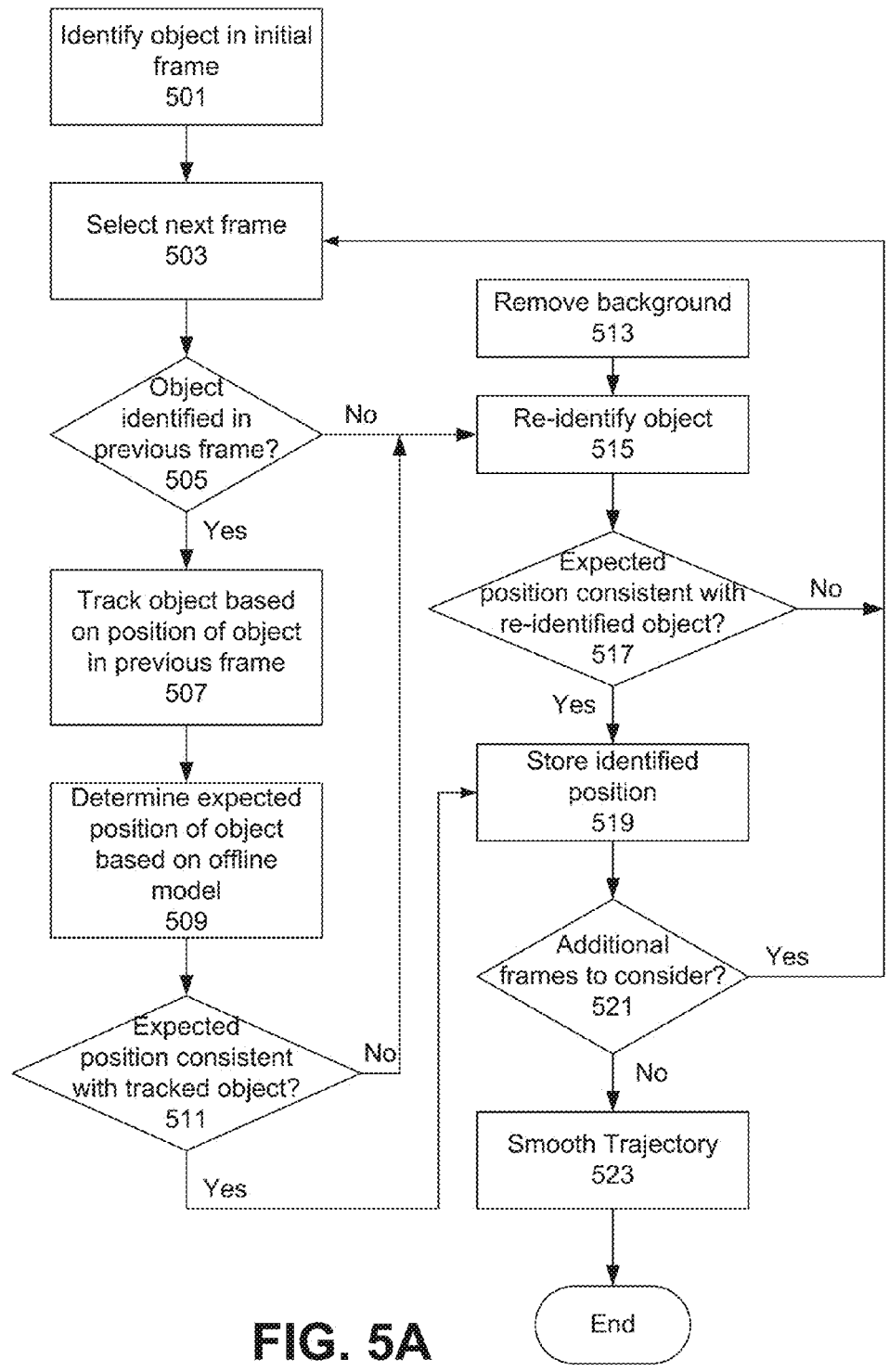
FIG. 5A, FIG. 5B and FIG. 5C are exemplary flowcharts illustrating a process for tracking an object in sports videos according to one embodiment.
Figure 5B:
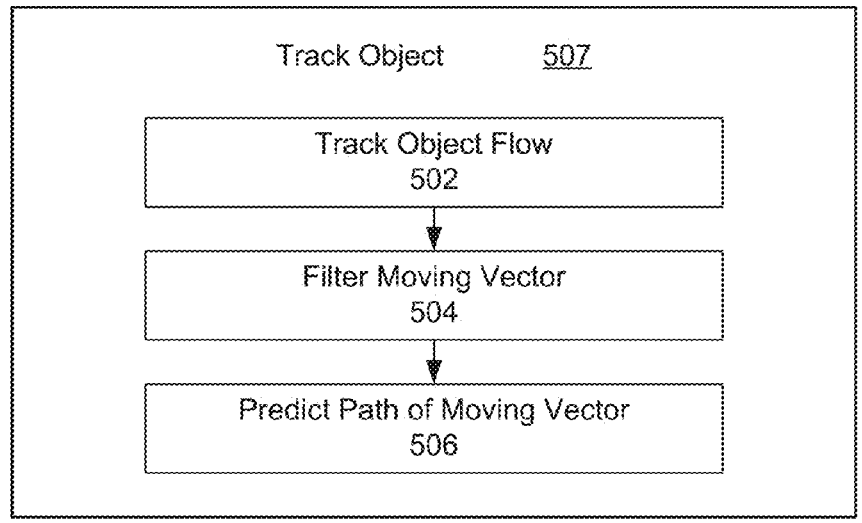
Figure 5C:
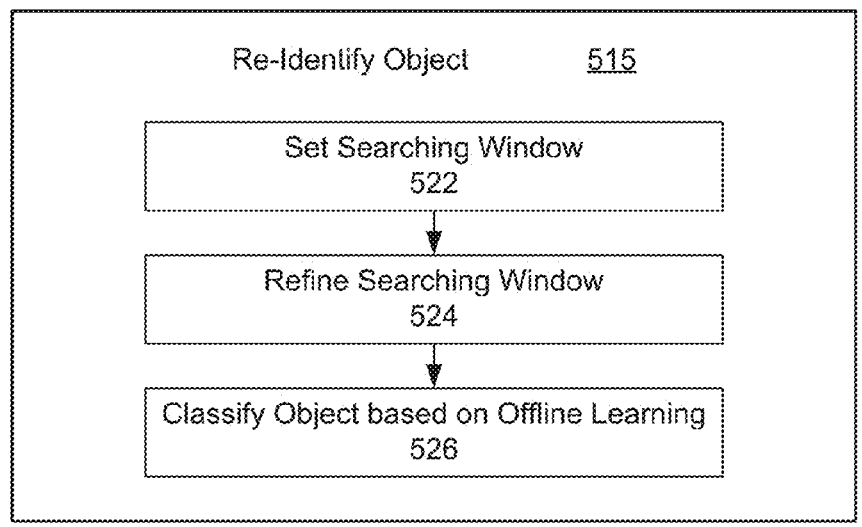

The position of one or more objects is tracked 430 on the recorded video. FIG. 5A, FIG. 5B and FIG. 5C illustrate the exemplary steps for tracking the position of an object. The tracked position of the objects is analyzed 440 by the analysis module 360. The analyzed tracked position is displayed 450 by the data output module 370. In some embodiment, the data output module 370 displays the user interface as illustrated in FIGS. 9A-9D and FIGS. 10A-10D.

FIG. 5A, FIG. 5B and FIG. 5C are exemplary flowcharts illustrating a process for tracking an object in sports videos according to one embodiment. For example, FIG. 5A illustrates the steps for tracking the position of an object in a sports video according to an embodiment. The initial identification module 501 identifies an initial position of the object being tracked in an initial video frame, e.g., the first fame, of a sports video. The next subsequent video frame in a temporal order is selected at step 503. A determination 505 is made whether the object was identified in the previous frame. If the object was identified in the previous frame, the position of the object is tracked 507 by the tracking module

340 based on the position of the object in the previous video frame, and the object is considered as a believable object.

FIG. 5B illustrates the sub-steps of step 507 in FIG. 5A for tracking the position of the object. The tracking module 340 tracks 502 an object flow of the object of interest. For instance moving vectors for between the previous video frame and the current video frame are determined. The moving vectors are then filtered 504 and the median of the remaining vectors are considered as the possible moving vector between the two frames. Finally, the path of the object is predicted 506 based on the position of the identified position of the object in the previous video frame.

Referring back to FIG. 5A, the tracking module 340 determines 509 the expected position of the object guided by the trained object classification model provided by the offline learning module 136. A determination 511 is made whether the expected position is consistent with the tracked position of the object predicted by the trained model. If the expected position is consistent with the tracked position of the object, the tracking module 340 stores 519 the identified position. Otherwise, if the expected position is not consistent with the tracked position of the object, or if the position of the object was not identified in the previous video frame, the re-identification module 350 re-identifies 515 the position of the object in the current frame.

In some embodiments, before the re-identification 515 of the position of the object, the background subtraction module 320 removes the background of the current video frame. FIG. 5C illustrates the sub-steps for re-identifying the position of the object according to one embodiment. The re-identification module 350 sets 522 a searching window, e.g., set the searching window twice the size of the believable object if the expected position of the object is not consistent with the tracked position of the object predicted by the trained model. In some embodiments, if the object was not identified in the previous video frame, the searching window for the re-identification is increased by a factor of 4. The searching window is refined 524 for tracking efficiency, e.g., using the binary mask from the background subtraction, and the position of the object is determined using the trained object classification model.

Referring back to FIG. 5A, after the position of the object is re-identified, the re-identification module 350 determines 517 whether the expected position is consistent with the re-identified object. If the expected position is consistent with the re-identified position, the identified position is stored 519 as the actual object. Otherwise, if the expected position is not consistent with the re-identified position, no position is stored for the current frame, and the re-identification module 350 repeats 521 the identification process of the position in the subsequent frames of the sports video. If no more video frames for tracking, the analysis module 360 applies 523 a smooth function to the tracked positions of an object of interest of the sports video to generate a smoothed trajectory of the tracked object. The data output module 370 presents the analysis result to users in a user friendly way as illustrated in FIGS. 9A-9D and FIGS. 10A-10D.

General

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for tracking an object in a video comprising:
   determining, by a computer, a position of the object in each frame of a plurality of frames of the video, wherein the determining comprises—:
      determining whether a position of the object associated with a current frame of the plurality of frames of the video was identified in a previous video frame; and
      responsive to determining that the position of the object was identified in the previous video frame:
         partitioning the current video frame into a plurality of patches;
         determining a dynamism score for each patch of the plurality of patches; and for each patch of the plurality of patches:
  determining that the patch is a background patch responsive to the dynamism score of the patch being below a threshold value; and
  removing the background patch from the current video frame;
identifying a new position of the object in the current video frame based on the identified position of the object in the previous video frame;
determining an expected position of the object based on the identified position of the object in the previous video frame and an object classification model; and
determining whether the new position is consistent with the expected position; and
responsive to determining that the new position is consistent with the expected position, storing, in a memory, the new position as the position of the object associated with the current video frame; and
determining, by the computer, a trajectory of the object based on the determined plurality of positions of the object.

2. The computer-implemented method of claim 1, wherein determining whether the new position is consistent with the expected position comprises:
  computing a score for every foreground patch of the current video frame based on a plurality of visual features of the object in the current video frame and corresponding features identified by the object classification model;
  comparing the highest score among the scores of the foreground patches of the current video frame with a threshold; and
  responsive to the highest score exceeding the threshold, recording the position of the foreground patch having the highest score.

3. The computer-implemented method of claim 1, wherein identifying a new position based on the identified position of the object in the previous video frame comprises:
  determining a searching window based on the identified position of the object in the previous video frame; and
  searching the position of the object in the current video frame using the searching window.

4. The computer-implemented method of claim 3, wherein searching the position of the object in the current video frame using the searching window comprises:
  determining a plurality of moving vectors, the plurality of moving vectors corresponding to a plurality of visual features in the previous frame and the visual features in the current video fame;
  determining an average moving vector based on the plurality of moving vectors; and
  determining a possible position of the object based on the average moving vector.

5. The computer-implemented method of claim 4, wherein determining the average moving vector comprises:
  determining an average of a subset of the plurality of moving vectors, the subset of moving vectors comprising moving vectors that are larger than a first threshold value and smaller than a second threshold value.

6. The computer-implemented method of claim 5, wherein the first threshold is the value of a first quartile of the subset of the plurality of moving vectors and wherein the second threshold is the value of a third quartile of the subset of the plurality of moving vectors.

7. The computer-implemented method of claim 4, wherein searching the position of the object in the current video frame using the searching window further comprises:
  determining a compensation value based on a possible position of the object and the identified position of the object in the previous video frame; and
  determining a believable position of the object by shifting the possible position of the object by the compensation value.

8. The computer-implemented method of claim 3, wherein determining the position of the object associated with the current video frame further comprises:
  responsive to determining that the new position is not consistent with the expected position:
    determining a new searching window by increasing the size of the searching window; and
    searching the position of the object in the current video frame using the new searching window.

9. The computer-implemented method of claim 3, wherein determining the position of the object associated with the current video frame further comprises:
  responsive to determining that the position of the object was not identified in the previous video frame:
    determining a new searching window by increasing the size of the searching window; and
    searching the position of the object in the video frame using the new searching window.

10. The computer implemented method of claim 9, wherein the searching window is increased by a factor of 4.

11. The computer-implemented method of claim 1, wherein determining a dynamism score of a patch of the plurality of patches comprises:
  determining a first dynamism value by determining a squared difference between red-green-blue (RGB) values of pixels in the patch of the current video frame and RGB values of pixels in a corresponding patch of the previous video frame;
  determining a second dynamism value by determining a squared difference between RGB values of pixels in the patch of the current video frame and RGB values of pixels in a corresponding patch of a next video frame; and
  determining the dynamism score based on the first dynamism value and the second dynamism value.

12. The computer-implemented method of claim 1, further comprising:
  smoothing the trajectory of the object, comprising:
    determining an energy function based on a distance and velocity between each of the plurality of positions associated with the plurality of video frames and a corresponding predicted position and acceleration of the predicted positions; and
    minimizing the energy function.

13. The computer-implemented method of claim 12, wherein the energy function is a quadratic function with a symmetric pentadiagonal matrix for coefficients of second order terms and a vector for coefficients of first order terms.

14. The computer-implemented method of claim 1, further comprising:
  displaying a visual overlay on a display of a device adapted to capture a video;
  capturing a video guided by the visual overlay; and
  determining an initial position of the object in an initial video frame, the initial position determined by searching for the object in a region defined by the visual overlay.

15. A computer program product including a non-transitory computer readable medium storing instruction for tracking an object in a video, the instructions when executed by a processor cause the processor to:
  determine a position of the object in each frame of a plurality of frames of the video, wherein the determining comprises:
    determining whether a position of the object associated with a current frame of the plurality of frames of the video was identified in a previous video frame; and
    responsive to determining that the position of the object was identified in the previous video frame:
      partitioning the current video frame into a plurality of patches;
      determining a dynamism score for each patch of the plurality of patches; and
      for each patch of the plurality of patches:
        determining that the patch is a background patch responsive to the dynamism score of the patch being below a threshold value; and
        removing the background patch from the current video frame;
      identifying a new position of the object in the current video frame based on the identified position of the object in the previous video frame;
      determining an expected position of the object based on the identified position of the object in the previous video frame and an object classification model; and
      determining whether the new position is consistent with the expected position; and
      responsive to determining that the new position is consistent with the expected position, storing the new position as the position of the object associated with the current video frame; and
  determine a trajectory of the object based on the determined plurality of positions of the object.

16. The computer program product of claim 15, wherein determining whether the new position is consistent with the expected position comprises:
  computing a score for every foreground patch of the current video frame based on a plurality of visual features of the object in the current video frame and corresponding features identified by the object classification model;
  comparing the highest score among the scores of the foreground patches of the current video frame with a threshold; and
  responsive to the highest score exceeding the threshold, recording the position of the foreground patch having the highest score.

17. The computer program product of claim 15, wherein identifying a new position based on the identified position of the object in the previous video frame comprises:
  determining a searching window based on the identified position of the object in the previous video frame; and
  searching the position of the object in the current video frame using the searching window.

18. The computer program product of claim 17, wherein searching the position of the object in the current video frame using the searching window comprises:
  determining a plurality of moving vectors, the plurality of moving vectors corresponding to a plurality of visual features in the previous frame and the visual features in the current video fame;
  determining an average moving vector based on the plurality of moving vectors; and
  determining a possible position of the object based on the average moving vector.

19. The computer program product of claim 18, wherein determining the average moving vector comprises:
  determining an average of a subset of the plurality of moving vectors, the subset of moving vectors comprising moving vectors that are larger than a first threshold value and smaller than a second threshold value.

20. The computer program product of claim 17, wherein determining the position of the object associated with the current video frame further comprises:
  responsive to determining that the new position is not consistent with the expected position:
    determining a new searching window by increasing the size of the searching window; and
    searching the position of the object in the current video frame using the new searching window.

21. The computer program product of claim 17, wherein determining the position of the object associated with the current video frame further comprises:
  responsive to determining that the position of the object was not identified in the previous video frame:
    determining a new searching window by increasing the size of the searching window; and
    searching the position of the object in the video frame using the new searching window.

22. The computer program product of claim 15, wherein determining a dynamism score of a patch of the plurality of patches comprises:
  determining a first dynamism value by determining a squared difference between red-green-blue (RGB) values of pixels in the patch of the current video frame and RGB values of pixels in a corresponding patch of the previous video frame;
  determining a second dynamism value by determining a squared difference between RGB values of pixels in the patch of the current video frame and RGB values of pixels in a corresponding patch of a next video frame; and
  determining the dynamism score based on the first dynamism value and the second dynamism value.

23. The computer program product of claim 15, wherein the instructions further cause the processor to:
  smooth the trajectory of the object, comprising:
    determining an energy function based on a distance and velocity between each of the plurality of positions associated with the plurality of video frames and a corresponding predicted position and acceleration of the predicted positions; and
    minimizing the energy function.

24. The computer program product of claim 23, wherein the energy function is a quadratic function with a symmetric pentadiagonal matrix for coefficients of second order terms and a vector for coefficients of first order terms.

25. The computer program product of claim 15, wherein the instructions further cause the processor to:
  display a visual overlay on a display of a device adapted to capture a video;
  capture a video guided by the visual overlay; and
  determine an initial position of the object in an initial video frame, the initial position determined by searching for the object in a region defined by the visual overlay.

* * * * *